US010759048B2

(12) United States Patent
Nagata et al.

(10) Patent No.: US 10,759,048 B2
(45) Date of Patent: Sep. 1, 2020

(54) DRIVING MECHANISM, ROBOT APPARATUS MEASUREMENT METHOD, ROBOT APPARATUS CONTROL METHOD AND COMPONENT MANUFACTURING METHOD

(71) Applicant: CANON KABUSHIKI KAISHA, Tokyo (JP)

(72) Inventors: Toru Nagata, Kawasaki (JP); Takayuki Ogawara, Yokohama (JP); Masaru Ogata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/292,851

(22) Filed: Oct. 13, 2016

(65) Prior Publication Data
US 2017/0113346 A1    Apr. 27, 2017

(30) Foreign Application Priority Data
Oct. 27, 2015    (JP) .................................. 2015-210914

(51) Int. Cl.
*G01C 21/00* (2006.01)
*B25J 9/16* (2006.01)
(Continued)

(52) U.S. Cl.
CPC ........... *B25J 9/1633* (2013.01); *B25J 9/1694* (2013.01); *B25J 13/085* (2013.01); *B25J 17/00* (2013.01);
(Continued)

(58) Field of Classification Search
CPC ........ B25J 9/1633; B25J 17/00; B25J 9/1694; B25J 13/085; G05B 2219/40587;
(Continued)

(56) References Cited

U.S. PATENT DOCUMENTS

| 5,594,944 A | 1/1997 | Ogata et al. |
| 5,602,910 A | 2/1997 | Tsutsui et al. |
(Continued)

FOREIGN PATENT DOCUMENTS

| CN | 102015223 | 4/2011 |
| CN | 102235926 | 11/2011 |
(Continued)

OTHER PUBLICATIONS

M. Gautier, et al, "Force calibrationof KUKA LWR-like robots including embedded joint torque sensors and robot structure". 2014 IEEE/RSJ International Conference on Intelligent Robots and Systems (IROS 2014), Sep. 14-18, 2014, Chicago, IL, pp. 416-421.
(Continued)

*Primary Examiner* — Ian Jen
(74) *Attorney, Agent, or Firm* — Venable LLP

(57) ABSTRACT

A sensor detection error at a joint of a robot arm is correctly detected. A joint structure that joins links and of a robot arm includes a sensor for determining force acting between the links. A driving apparatus that generates a driving force of a joint includes first and second driving parts. A constraining part that constrains the joint movable in a driving direction of the joint and be unmovable in another direction includes first and second supporting parts that are movable relative to each other in the driving direction of the joint. The driving part of the driving apparatus is fixed to the link, and the supporting part of the constraining part is fixed to the link. Also, the supporting part of the constraining part is fixed to the driving part of the driving apparatus. The sensor is fixed so as to link the supporting part and the link.

19 Claims, 6 Drawing Sheets

(51) Int. Cl.
*B25J 17/00* (2006.01)
*B25J 13/08* (2006.01)

(52) U.S. Cl.
CPC .......... *G05B 2219/37581* (2013.01); *G05B 2219/40536* (2013.01); *G05B 2219/40559* (2013.01); *G05B 2219/40587* (2013.01)

(58) Field of Classification Search
CPC ........... G05B 2219/40559; G05B 2219/40536; G05B 2219/37581
See application file for complete search history.

(56) References Cited

U.S. PATENT DOCUMENTS

| | | | |
|---|---|---|---|
| 6,220,104 | B1 | 4/2001 | Yoshino |
| 8,291,788 | B2 | 10/2012 | Ihrke et al. |
| 8,443,693 | B2 | 5/2013 | Ihrke et al. |
| 8,443,694 | B2 | 5/2013 | Ihrke et al. |
| 8,504,208 | B2 * | 8/2013 | Orita ................. B25J 9/1664 700/245 |
| 9,405,288 | B2 | 8/2016 | Ogata |
| 2005/0135720 | A1 | 6/2005 | Ohno |
| 2008/0245172 | A1 | 10/2008 | Kiyosawa |
| 2010/0005907 | A1 | 1/2010 | Kato |
| 2011/0067517 | A1 | 3/2011 | Ihrke |
| 2011/0239788 | A1 | 10/2011 | Nagasaka |
| 2012/0048628 | A1 | 3/2012 | Kawanami |
| 2012/0061981 | A1 | 3/2012 | Motonaga |
| 2012/0065902 | A1 | 3/2012 | Nakajima |
| 2012/0259463 | A1 * | 10/2012 | Orita ................ B25J 9/1648 700/245 |
| 2014/0000388 | A1 * | 1/2014 | Sato .................... G01L 1/04 73/862.642 |
| 2014/0060223 | A1 | 3/2014 | Tanaka |
| 2015/0045952 | A1 | 2/2015 | Kosaka |
| 2015/0045954 | A1 | 2/2015 | Negishi |
| 2015/0209958 | A1 * | 7/2015 | Hasegawa ............ B25J 9/102 74/416 |
| 2015/0273692 | A1 | 10/2015 | Ogawara |
| 2016/0252410 | A1 * | 9/2016 | Teshigawara ......... G01L 1/2206 73/862.046 |
| 2016/0311111 | A1 | 10/2016 | Ogawara |
| 2018/0126547 | A1 * | 5/2018 | Corkum ............... B25J 9/1697 |

FOREIGN PATENT DOCUMENTS

| | | |
|---|---|---|
| CN | 104097209 | 10/2014 |
| JP | H07-52074 | 2/1995 |
| JP | 2005-180578 | 7/2005 |
| JP | 2008-223800 | 9/2008 |
| JP | 2009-288198 | 12/2009 |
| JP | 2010-190408 | 9/2010 |
| JP | 4688261 | 2/2011 |
| JP | 2011-72186 A | 4/2011 |
| JP | 2011-209099 | 10/2011 |
| JP | 2012-047460 | 3/2012 |
| JP | 2012-63164 | 3/2012 |
| JP | 2012-81563 | 4/2012 |
| JP | 2012-176465 | 9/2012 |
| JP | 2012-176465 A | 9/2012 |
| JP | 2012-250320 | 12/2012 |
| JP | 2013-193183 | 9/2013 |
| JP | 2015-30078 | 2/2015 |
| JP | 2015-123570 | 7/2015 |
| KR | 10-0909457 | 7/2009 |

OTHER PUBLICATIONS

European Office Action dated May 2, 2017 in European Application No. 16002238.0.
Extended European Search Report dated May 2, 2017 in counterpart European Application No. 16002238.0.
Japanese Office Action dated Oct. 15, 2019 during prosecution of related Japanese application No. 2015-210914. (English-language machine translation included.)
Chinese Office Action dated Oct. 25, 2019 during prosecution of related Chinese application No. 201610970172.0 (English-language machine translation included.)
M. Gautier, "Force calibration of KUKA LWR-like robots including embedded joint torque sensors and robot structure", 2014 IEEE RSJ International Conference on Intelligent Robots and System (IROS 2014) Sep. 14-18, 2014, Chicago, IL.
European Search Report dated Jul. 29, 2019 during prosecution of related European application No. 19165638.8.
C. Park, et al., "Study on the Requirements of Joint Torque Sensors considering Mechanical Condition of the Joint Mechanism of a manipulator", 2012 12th International Conference on Control, Automation and Systems. Oct. 17-21, 2012.
J. Min, et al, "Robot Joint Module Equipped with Joint Torque Sensor with Disk-Type Coupling for Torque Error Reduction", ICIRA 2015.
D. Vischer, et al, "Design and Development of High-Performance Torque-Controlled Joints", IEEE Transactions On Robotics and Automation, Aug. 1995.
H. Zhang, et al, "Torque Estimation Technique of Robotic Joint with Harmonic Drive Transmission", 2013 IEEE International Conference on Robotics and Automation, May 6-10, 2013.
H. Kim, et al., "Safe joint module for safe robot arm based on passive and active compliance method", Mechatronics 22 (2012).
H. Fujioka, et al., "Motion/Force/Impedance Control of Manipulator Using Joint Torque Control", Annual Report, The Research Institute for Science and Technology, No. 24 Tokyo Denki University. (Partial English Translation and English language Abstract included).
M. Laffranchi, et al., "A Compact Compliant Actuator (CompAct) with Variable Physical Damping", 2011 IEEE International Conference on Robotics and Automation, May 9-13, 2011.
M. Nishino, et al., "Low-cost Torque Sensor for Compression of Gear Friction by Using Optical Sensor", 2015 JSME Conference on Robotics and Mechatronics, May 17-19, 2015. (English language abstract included).
K. Suzumori, "Back drivability of Robots and Actuators", 2013 Journal of the Robotics Society of Japan, vol. 31, No. 6, 2013. (Partial English language translation included).
C. Zhang, et al., "Basic Study on Control of Robot Arms Using Joint Torque Sensors", 1995-12 Transactions of the Japan Society of Mechanical Enginees, vol. 61, No. 592. (Partial English language translation and English Abstract included).
M. Hashimoto, "Motion Control of Robot Arms with Reducers Based on Joint Torque Feedback", 1989 Transactions of the Society of Instrument and Control Engineers, vol. 25, No. 2, 188/193. (Partial English language translation and English Abstract included).
H. Osumi, "Basic Knowledge of Robot Motion Control" 2007 Journal of the Japan Society for Precision Engineering, vol. 73, No. 10. (Partial English language translation included).
T. Kaneko, et al., "Motion Control of Multi-Axis Manipulator Using Robust Servo System with Two Degrees of Freedom", 1991 Journal of the Robotics Society of Japan, vol. 9, No. 7. (Partial English language translation and English Abstract included).
Japanese Office Action dated Mar. 17, 2020 issued in corresponding Japanese Application No. 2015-210914 (with English language translation from Global Dossier).
M. Gautier, "Force calibration of KUKA LWR-like robots including embedded joint torque sensors and robot structure," pp. 416-421, EEE/RSJ International Conference on Intelligent Robots and Systems, Sep. 14-18, 2014.
European Notice of Opposition dated Jan. 29, 2020 issued in European Application No. 1602238.0.
European Notice of Opposition dated Mar. 20, 2020 in European Application No. 16002238.8.
Chinese Office Action dated Jun. 10, 2020 in corresponding Chinese application No. 201610970172.0. (with whole English translation).

* cited by examiner

DRIVING MECHANISM, ROBOT APPARATUS MEASUREMENT METHOD, ROBOT APPARATUS CONTROL METHOD AND COMPONENT MANUFACTURING METHOD

BACKGROUND OF THE INVENTION

Field of the Invention

The present invention relates to a driving mechanism including a sensor that measures force acting on a link joined to the driving mechanism, a robot apparatus measurement method and a robot apparatus control method, and a component manufacturing method.

Description of the Related Art

In recent years, multijoint robots have been used on various industrial product production lines. However, there are many processes that are difficult to perform with multijoint robots. For example, on production lines for assembling, e.g., automobile components, multijoint robots are widely used particularly in processes in which a load of several hundred grams to several kilograms is imposed on a component. On the other hand, there are various difficulties in performing processes requiring a load provided to a component to be around several grams such as attachment of a work including, e.g., a soft object, a lightweight object or a low-strength member and processes for providing a precise fit with multijoint robots.

As stated above, in processes that cannot be performed with multijoint robots, currently, dedicated apparatuses or tools specialized for those processes are used instead of multijoint robots. However, such dedicated apparatuses or tools are designed and manufactured only for a particular process or a work to be handled, and thus there is a problem in that significant time and costs are spent until an apparatus or a tool of such type is actually prepared and, for example, a production line is started.

Therefore, there is a demand for performing a process in which a fragile work including, e.g., a soft object, a lightweight object or a low-strength member such as mentioned above is handled, using a versatile multijoint robot rather than a dedicated device and/or a dedicated tool.

Where a work including a soft object, a lightweight object or a low-strength member such as mentioned above is handed, for example, for prevention of breakage or deformation of the work, it is impossible to cause a large force to act on the work. Therefore, if a work of this type is manipulated with a multijoint robot, it is necessary to control force acting on the work with high precision via a joint or a link.

For example, a configuration in which a force sensor is disposed together with an end-effector such as a hand or a gripper attached to a distal end of a multijoint robot has conventionally been known. An output value from this force sensor is fed-back for driving control of the end-effector, whereby force acting on a work can be controlled. Also, in addition to the end-effector at the end, for example, it is conceivable that forces acting on respective links included in an arm of the multijoint robot are measured and fed back for driving control of the multijoint robot. In particular, a force that is necessary to be measured for high-precision driving control of a multijoint robot from among forces acting on links of a robot arm is a torque acting around a driving axis.

As a measure for detecting a torque acting on a link of an arm such as mentioned above, a configuration in which a torque sensor is mounted on a joint of a robot arm is proposed (for example, Japanese Patent Application Laid-Open No. 2011-72186).

Gravitational force, inertial force and/or Coriolis force, which act on a link itself, and/or force from an adjacent link act on a joint of a multijoint robot arm depending on a motion of the arm. For example, the forces acting on the joint include respective components of a total of forces in six directions including translational forces in three coordinate axis directions and rotative forces around three coordinate axes in an orthogonal coordinate system where a driving axis of the joint is a z-axis. In the below, from among the forces in the six directions, forces acting in five directions other than a force acting around the driving axis of the joint is referred to as a force in another axial direction.

On the other hand, in driving control of a multijoint robot arm, for example, a force around a driving axis of a joint, the force acting on a link, is detected and fed back for driving of the joint. Thus, it is desirable that a force sensor mounted on a joint can correctly detect a force around a driving axis of the joint, the force acting on a link joined to the joint.

However, upon a force in another axial direction such as mentioned above acting on a force sensor, the force sensor fails to correctly detect a force around a driving axis. For example, if a force in another axial direction acts on a force sensor of a type that includes a deformable part and determines the force by detecting an amount of deformation occurred in the deformable part, the force sensor deforms also in a circumferential direction of the driving axis of the joint from the effect of the force in the other axial direction.

Hereinafter, the effect of the force in the other axial direction on the force sensor is referred to as "interference in another axial direction". In other words, upon some kind of deformation occurring in the force sensor as a result of a force in another axial direction being exerted on the force sensor, the deformation appears as a detection error of the force sensor that detects a force around the driving axis of the joint. In other words, a measurement error caused in a force sensor provided on a driving axis of a certain joint by a force in another axial direction as stated above is referred to as "interference in another axial direction". If such interference in another axial direction occurs, it is impossible to correctly detect a force around the driving axis of the joint with the force sensor.

Therefore, in order to correctly detect a force around a driving axis of a joint, for example, it is necessary to correct a sensor detected value error caused by interference in another axial direction in some way. Therefore, for example, it is conceivable that a force in another axial direction acting on a force sensor is detected to correct a detected value from the force sensor.

However, a conventional joint structure such as described in Japanese Patent Application Laid-Open No. 2011-72186, a bearing is disposed between a force sensor and a link, and thus, it is not so easy to detect a value of a force in another axial direction.

A reason of difficulty in detection of a value of a force in another axial direction where a mechanical element such as a bearing is interposed at a joint of a multijoint robot arm like the conventional configuration in Japanese Patent Application Laid-Open No. 2011-72186 is provided below.

For example, this type of joint structure allows motion of a joint in a desired one direction only, and uses a bearing such as a cross roller bearing as a constraining unit (constraining part) for constraining motion in another direction. Such structure may result in complexity of a transfer pathway of a force in another axial direction.

For example, depending on the joint structure, there may be a pathway on which a joint driving force is transferred other than a joint axis connecting two links. For example, in the structure indicated in Japanese Patent Application Laid-Open No. 2011-72186, a force in another axial direction acting on a drive-side link is transferred via both a bearing, which is a constraining unit of the joint, and the force sensor. With such configuration, it is difficult to obtain a correct value of the force in another axial direction transferred to the force sensor.

In particular, a driving force of a link reduced by the amount of a frictional force of a bearing, which is a constraining part of a joint, is transferred to a force sensor. Thus, in order to correctly grasp a force in another axial direction acting on the force sensor, it is necessary to grasp the frictional force of the bearing disposed on the joint. However, a frictional force of a bearing of a joint exhibits non-linear characteristics relative to various factors such as a force acting on the bearing, a driving speed of the joint and an individual specificity of the bearing, and thus it is difficult to correctly grape a frictional force of a bearing.

SUMMARY OF THE INVENTION

The present invention enables accurate detection of a force in another axial direction acting on a joint of a robot arm, and thus enables correction of a detection error of a force sensor caused by interference in another axial direction and accurate detection of a force acting on a link joined to the joint.

According to an aspect of the present invention, in order to solve the above described problem, a driving mechanism for driving a first link and a second link relative to each other, the driving mechanism comprises: a driving apparatus that includes a fixed part and a part to be driven and drives the part to be driven relative to the fixed part; and a constraining part that includes a first supporting part and a second supporting part and constrains the first link and the second link so as to be movable in a desired direction and be unmovable in another direction, wherein one of the fixed part and the part to be driven is fixed to the first link; the first supporting part is fixed to the first link; the second supporting part is fixed to another of the fixed part and the part to be driven; and a sensor for determining force acting on the second link is attached so as to link the other of the fixed part and the part to be driven and the second link.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention enables simplification of a transfer pathway of a force in another axial direction applied to a force sensor. Thus, a value of a force in another axial direction applied to the force sensor can be grasped with high precision, and consequently, a sensor detected value error caused by interference in another axial direction can be corrected with high precision, enabling high-precision sensor detected value correction. Use of the corrected sensor detected value for driving control of the multijoint robot enables high-precision driving control and thus enables the multijoint robot to perform a process that has conventionally been difficult to perform with a multijoint robot.

More specifically, use of the corrected sensor detected value for driving control of the multijoint robot enables high-precision control of a force provided to a component by an end-effector attached to a distal end of the multijoint robot. Consequently, a process requiring a load provided to a component to be around several grams such as a process for attachment of a soft object or a low-strength member can be automated by a multijoint robot.

Modes for carrying out the present invention will be described below with reference to the embodiments illustrated in the attached drawings. The below-indicated embodiments are definitely mere examples, and can arbitrarily be changed by a person skilled in the art without departing the spirit of the present invention, regarding, for example, a configuration of a minor part. Also, numerical values indicated in the present embodiment are reference numerical values, and are not intended to limit the present invention.

In each of the embodiments described below, a sensor having a function that determines a force acting around a driving axis of a joint is referred to as a force sensor.

Embodiment 1

Basic Configuration of Multijoint Robot System

Figure 1:
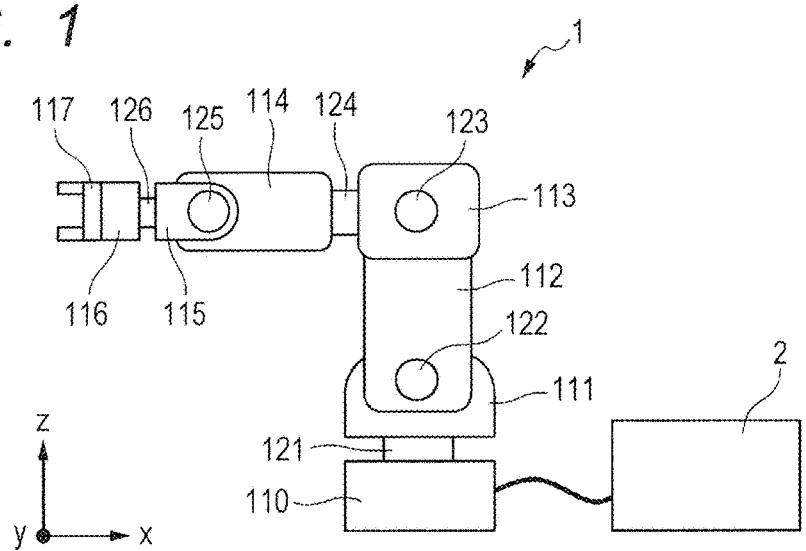
FIG. 1 is a diagram illustrating a configuration of a robot system according to an embodiment of the present invention.

FIG. 1 illustrates a basic configuration of a multijoint robot system to which the present embodiment can be applied. The robot system in FIG. 1 includes a robot arm 1 configured, for example, as a multijoint robot arm, and a robot control apparatus 2 that controls the robot arm 1.

The robot arm 1 is a multijoint robot arm having a vertical six-axis configuration. The robot arm 1 includes first to sixth links 111 to 116 joined via first to sixth joints 121 to 126 on a base 110. The base 110 and the first link 111 of the robot arm 1 are connected by a joint 121 that rotates around a rotary axis in a Z-axis direction. Also, the first link 111 and the second link 112 of the robot arm 1 are connected by a joint 122 that rotates around a rotary axis in a Y-axis direction. Also, the second link 112 and the third link 113 of the robot arm 1 are connected by a joint 123 that rotates around a rotary axis in the Y-axis direction. Also, the third link 113 and the fourth link 114 of the robot arm 1 are connected by a joint 124 that rotates around a rotary axis in an X-axis direction. Also, the fourth link 114 and the fifth link 115 of the robot arm 1 are connected by a joint 125 that rotates around a rotary axis in the Y-axis direction. Also, the fifth link 115 and the sixth link 116 of the robot arm 1 are connected by a joint 126 that rotates around a rotary axis in the X-axis direction.

An end-effector 117 such as a motor hand or an air-powered hand for performing component assembling work or component transfer work on a production line is connected to a tip of the sixth link 116 of the robot arm 1.

Motion of the robot arm 1 is controlled by the robot control apparatus 2. For example, the robot control apparatus 2 controls a pose (position and orientation) of each joint of the robot arm 1 according to a preprogrammed robot control program, whereby a pose of the robot arm 1 or a position and a pose of a reference site set in the vicinity of the end-effector 117 is controlled. Also, in synchronization with this, the robot control apparatus 2 can manipulate a work using the robot arm 1 by controlling motion of the end-effector 117, for example, a motion such as opening/closing of the hand. Consequently, a component can be manufactured.

In FIG. 1, three-dimensional coordinate axes for the entire robot arm 1 are indicated in the lower left part. Then, the robot arm 1 in FIG. 1 is illustrated in a pose in which the first joint 121 makes the adjacent link rotate around the rotary axis in the Z-axis direction, and the second joint 122, the third joint 123 and the fifth joint 125 make the respective adjacent links rotate around the respective rotary axes in the Y-axis direction. Also, the fourth joint 124 and sixth joint 126 are configured to make the respective adjacent links rotate around the respective rotary axes in the X-axis direction. However, a relationship between the rotary axis of each of the joints and the relevant coordinate axis is one that is applicable to the pose of the robot arm 1 in FIG. 1. Therefore, for example, use of another coordinate system may be needed if the robot arm 1 is controlled to be in a pose that is different from that of FIG. 1 by the robot control apparatus 2.

(Basic Structure of Joint of Multijoint Robot)

Figure 2:
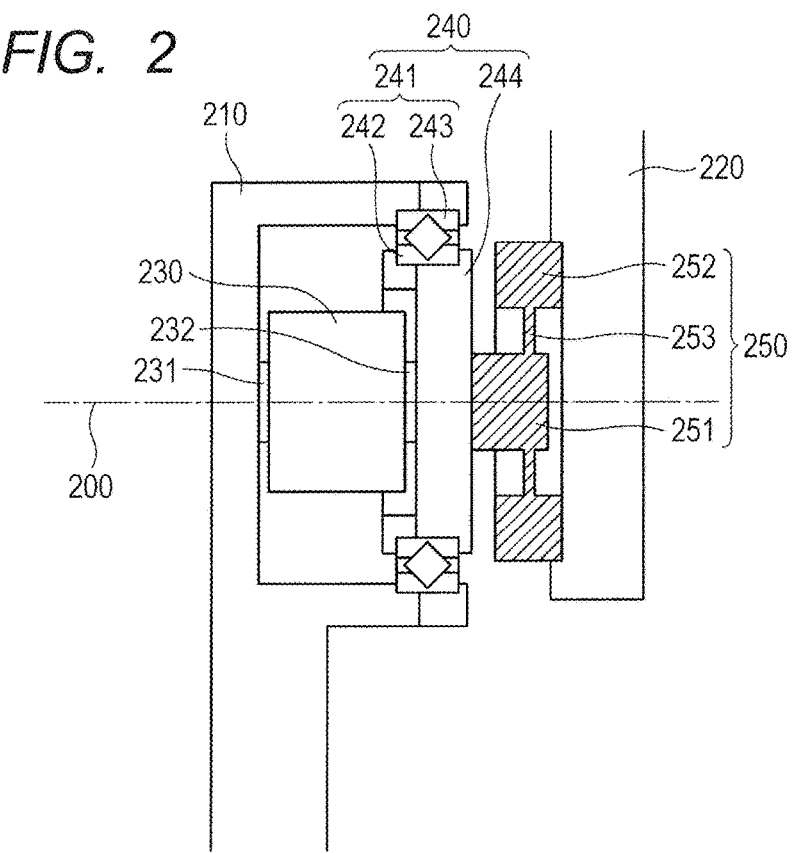
FIG. 2 is a diagram schematically illustrating a structure of a joint of the robot arm in FIG. 1.

FIG. 2 schematically illustrates an example basic structure of a joint in the robot arm 1 in FIG. 1.

In the below, in order to more generally indicate a configuration of the robot arm 1 in FIG. 1 with reference to FIG. 2, an arbitrary joint from among the first to sixth joints 121 to 126 may be referred to as "n-th joint". Also, in order to indicate this "n-th (joint; the same applies to "link")" more simply, indications of reference numerals in the figure with a subscript "n" prefixed is used. Also, a joint adjacent to the "n-th" joint on the end side of the arm may be indicated as an "n+1" joint, and a joint adjacent to the "n-th" joint on the base side may be indicated as an "n−1" joint. In the arm configuration in FIG. 1, n corresponds to the number of a joint (or a link) of the robot arm 1 and may take the value of 1 to 6. Also, in order to avoid complexity, an indication of the letter n may be omitted in the figure.

FIG. 2 illustrates a driving mechanism included in a joint joining the first and second links (210, 220) so as to be movable relative to each other. The driving mechanism in FIG. 2 includes a sensor for determining force acting on the first and second link (210, 220).

In FIG. 2, an n-th joint joins an n−1-th link 210 and an n-th link 220. The n-th joint includes a driving unit n230 that drives the n-th joint and a constraining part n240 that constrains motion of the n-th joint. Also, the n-th joint includes a force sensor $_n$250 that detects a force exerted on links joined via the n-th joint.

The n−1-th link 210 and the n-th link 220 are joined via this joint so as to be movable relative to each other, and respective poses of the n−1-th link 210 and the n-th link 220 are controlled by a driving force generated by the driving unit $_n$230.

The driving unit $_n$230 that generates a driving force of the joint includes a fixed part 231 and a part to be driven 232 as a first driving part and a second driving part, respectively. Although, illustration of details of an inner configuration of the driving unit $_n$230 is omitted in FIG. 2, the driving unit of this type of robot joint includes, for example, an electric motor and a reducer. Rotation of an output shaft of the electric motor is input to the reducer, and the rotation of the output shaft of the electric motor is reduced at a predetermined reduction ratio and is transferred to the part to be driven 232. For the reducer of the driving unit $_n$230, for example, a strain wave gearing is used.

The constraining part $_n$240 has a function that constrains respective a direction of relative movement of the first and second links in such a manner that the first and second links are movable in a direction in which the joint is driven and are unmovable in the other directions. In other words, the constraining part $_n$240 constrains motion of the joint in such a manner that the joint is movable only around a driving axis $_n$200 of the n-th joint and is unmovable in the other directions. The constraining part $_n$240 can include, for example, a cross roller bearing 241 and a connecting member 244 fixed to an inner race 242 of the cross roller bearing 241. The inner race 242 and an outer race 243 of the cross roller bearing 241 are disposed at respective positions at which the inner race 242 and the outer race 243 are rotatable around the driving axis $_n$200. The inner race 242 and the outer race 243 of the cross roller bearing 241 included in the constraining part $_n$240 correspond to a first supporting part and a second supporting part of the constraining part $_n$240.

The force sensor $_n$250 includes, for example, a torque sensor that measures a displacement in order to determine a force around the driving axis $_n$200 of the joint, the force being applied to the torque sensor itself. In that case, the force sensor $_n$250 includes, for example, an inner race part 251, an outer race part 252, and a spring part 253 linking the inner race part 251 and the outer race part 252. With such configuration, when a force around driving axis $_n$200 acts on the force sensor $_n$250, the spring part 253 deforms, enabling the force sensor $_n$250 to measure a driving force of a joint, the driving force acting on the link, from an amount of deformation of the spring part 253.

For example, a sensitivity matrix (n330, which will be described later) for converting a deformation amount of the force sensor $_n$250 into a force is provided in advance in the form of, e.g., a table memory, whereby a measured deformation amount can be converted into a measurement amount of a force. Examples of a force sensor displacement detection method for measuring an amount of deformation of the force sensor $_n$250 include, e.g., a strain gauge method, a capacitance method, a magnetic method and an optical encoder method. For example, in the case of the optical encoder method, a configuration in which a scale of an optical rotary encoder and an optical sensor (not illustrated) are disposed so as to face the connecting member 244 and the outer race part 252, respectively.

In the n-th joint in FIG. 2, a mechanical joining (connection) relationship is configured below.

(i) The fixed part 231 (first driving part) of the driving unit $_n$230 in FIG. 2 is fixed to the n−1-th link 210 (tentatively referred to as "first link"), and the part to be driven 232 (second driving part) is fixed to the connecting member 244. The connecting member 244 fixedly links the inner race part 251 of the force sensor $_n$250, the inner race 242 (second supporting part) of the constraining part $_n$240 and the n-th link 220 (tentatively referred to as "second link") to one another.

(ii) The outer race 243 (first supporting part) of the cross roller bearing 241 (constraining part) is fixed to the n−1-th link 210 (first link).

(iii) Also, the connecting member 244 is fixed to the inner race part 251 of the force sensor $_n$250.

(iv) The outer race part 252 (second supporting part) of the force sensor $_n$250 is fixed to the n-th link 220 (second link).

Figure 7:
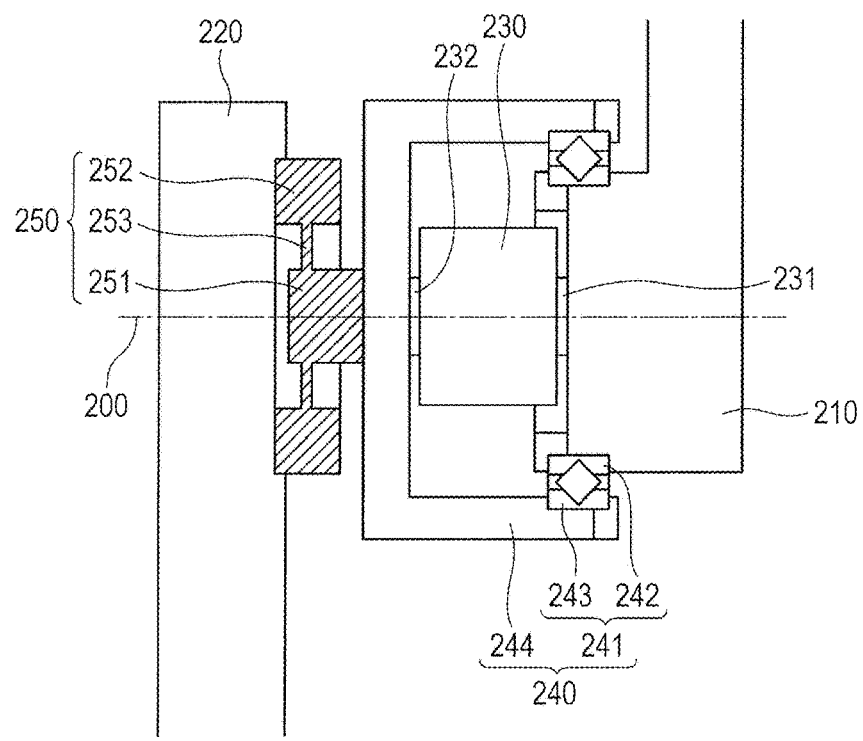
FIG. 7 is a diagram schematically illustrating another joint structure in the robot arm in FIG. 1.

Also, as a structure that is equivalent to that of the joint described with reference to FIG. 2, a joint structure such as illustrated in FIG. 7 may be employed. In FIG. 7, members having a disposition (linkage or joining) relationship corresponding to that of FIG. 2 are provided with reference numerals that are the same as those of FIG. 2.

Although in the joint structure in FIG. 7, a force sensor $_n$250 is disposed at a position that is different from that of FIG. 2, the linkage (joining) relationship among the respective parts of the joint structure is similar to that of the joint in FIG. 2. However, in FIG. 7, positions of links 210 and 220 are switched from each other so as to correspond to the first and second links in the linkage (joining) relationship described in (i) to (iv) above. Likewise, in FIG. 7, a positional relationship between a fixed part 231 (first driving part) of a driving unit $_n$230 and a part to be driven 232 (second driving part) is opposite to that of FIG. 2.

Furthermore, in FIG. 7, an outer race 243 of a cross roller bearing 241 (constraining part) corresponds to the second supporting part of the constraining part in (i) to (iv) above, and an inner race 242 corresponds to the first supporting part of the constraining part in (i) to (iv) above. Also, the connecting member 244 in (i) to (iv) above corresponds to a cylindrical housing part covering the driving unit $_n$230 in FIG. 7. An inner race part 251 of the force sensor $_n$250 is fixed to the connecting member 244, and an outer race part 252 of the force sensor $_n$250 is fixed to the link 220 (second link).

As with the joint structure in FIG. 2, the joint structure in FIG. 7 satisfies the linkage (joining) relationship described in (i) to (iv) above. Thus, the structure in FIG. 7 also enables joint driving force measurement and joint driving control, which will be described later, and can be expected to provide operation and effects similar to those of the joint structure in FIG. 2 (described later).

Figure 8:
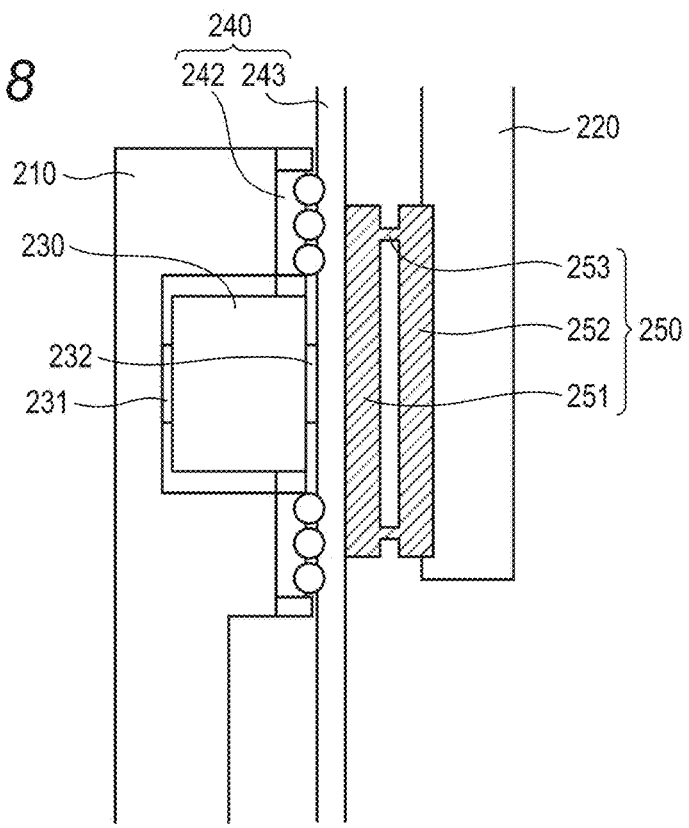
FIG. 8 is a diagram illustrating a slider joint having a configuration that is similar to that of the joint in FIGS. 2 to 7.

Also, FIG. 2 indicates a structure in which the links rotationally move relative to each other; however, in the case of a slider joint that linearly moves links relative to each other, the structure in FIG. 8 may be employed. In FIG. 8, also, members having a disposition relationship corresponding to that of FIG. 2 (or FIG. 7) are provided with reference numerals that are the same as those of FIG. 2 (or FIG. 7). Although a reference numeral correspondence between FIGS. 8 and 2 is similar to that in the case of FIG. 7 above and thus is not described repeatedly, even though the joint structure in FIG. 8 is a slider joint, a linkage (joining) relationship among respective parts of the joint structure is equivalent to that of FIG. 2 (FIG. 7) described in (i) to (iv) above.

As illustrated in FIGS. 7 and 8, various configurations that satisfy the linkage (joining) relationship such as described in (i) to (iv) above are conceivable, and it should be understood that a person skilled in the art can make various design changes to the joint structure according to the present embodiment described above as an example.

(Control of Robot Arm)

The plurality of joints of the robot arm 1 configured as illustrated in FIG. 2 is controlled by the robot control apparatus 2. The robot control apparatus 2 controls respective angles of n-th joints (first to sixth joints 121 to 126) and thereby can cause the robot arm 1 to take a desired pose.

Here, the robot control apparatus 2 can control, for example, a force applied on a work (not illustrated) manipulated via the end-effector 117. For example, the robot control apparatus 2 can receive inputs of measured values from force sensors disposed at respective joints (n) of the robot arm 1 and feed the measured values back to the driving units $_n$230 of the respective joints. Consequently, for example, feedback control such as controlling a force applied to a work to be a desired magnitude or performing control to prevent a force having a predetermined magnitude or more from being applied to a work can be performed.

Figure 3:
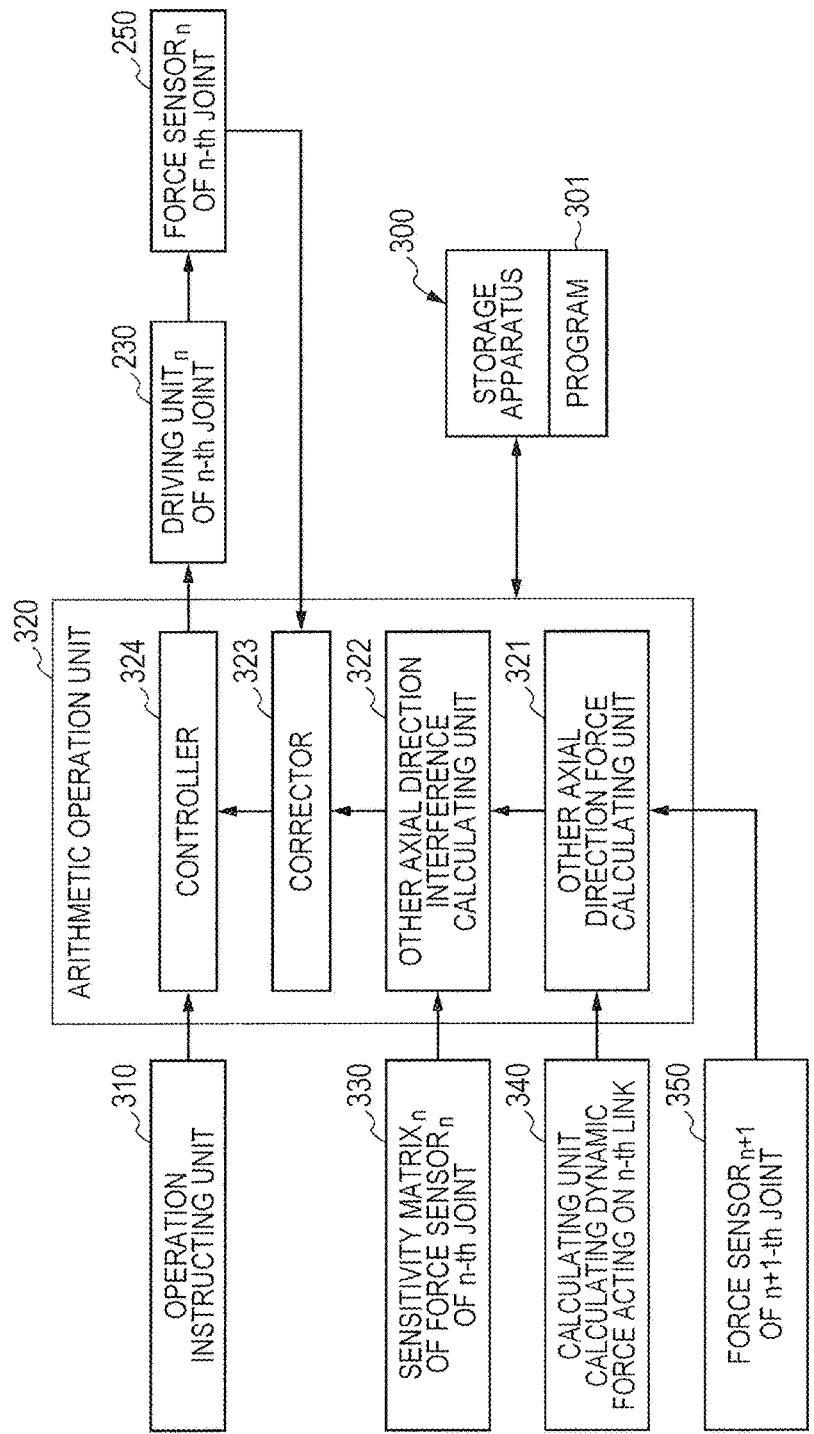
FIG. 3 is a block diagram illustrating a configuration of a control system of the robot system in FIG. 1.

FIG. 3 illustrates a configuration of a control system for an n-th joint of the robot arm 1 in the robot control apparatus 2 as a function block diagram. In the function blocks of the control system, a major part includes an arithmetic operation unit 320 and a storage apparatus 300.

The arithmetic operation unit 320 can include a computer, for example, a CPU including, e.g., a general-purpose microprocessor. Examples of a storage device used for the storage apparatus 300 include semiconductor memories such as a ROM and a RAM and fixed (external) storage apparatuses such as an HDD and an SSD. Also, for the storage device used for the storage apparatus 300, a configuration using a rewritable recording medium such as any of various flash memories or optical (magnetic) disks is conceivable. The storage apparatus 300 can include an arbitrary combination of these storage devices.

The storage device included in the storage apparatus 300 provides a recording medium that the arithmetic operation unit 320 (computer) can read. For example, in the storage apparatus 300, a program 301 in which a later-described control procedure to be executed by the arithmetic operation unit 320 (computer) that provides the control apparatus for the robot arm 1 is written can be stored.

Also, in the storage apparatus 300, information necessary for making the robot arm 1 manipulate works to, for example, assemble and manufacture a certain industrial product can be stored in the form of, for example, a robot control program. The robot control program is written in the form of, for example, what is called a teaching point list in which a position and a pose of the reference site at the end of the robot arm 1 is defined or an arbitrary robot programming language. Particularly for the n-th joint in FIG. 2, in the robot control program, operation of the driving unit $_n$230 of the joint is stored.

Also, in the storage apparatus 300, a later-described sensitivity matrix $_n$330 for a force sensor $_n$250 can be stored in a form such as a table memory. The sensitivity matrix $_n$330 can be stored, for example, in the form of a file in an HDD included in the storage apparatus 300, and is loaded to a particular area of a RAM at the time of program execution or system initialization, which will be described later. Consequently, the arithmetic operation unit 320 can refer to the sensitivity matrix $_n$330 for the force sensor $_n$250 of the relevant joint.

Furthermore, in FIG. 3, an operation instructing unit 310 includes, for example, a PC terminal for control, which is disposed in the vicinity of the robot arm 1 or a control terminal such as what is called a teaching pendant (TP). An operator (user) can make the robot arm 1 take arbitrary motion by, for example, operating the operation instructing unit 310 in real time while checking the state of the robot arm 1. Also, motion of the robot arm 1 can be checked or a part of the robot control program can be modified by tracing execution of the aforementioned robot control program.

Also, in FIG. 3, driving control of the driving unit $_n230$ of the relevant joint (for example, later-described driving force control of the joint) is performed by the arithmetic operation unit 320 via a driver circuit (for example, a servocontrol circuit), details of which are not illustrated. Consequently, the robot arm 1 is controlled to take a pose necessary for certain work. Here, the arithmetic operation unit 320 can acquire a measured value of a driving force of the relevant joint at every moment in synchronization with, e.g., a system clock, from the force sensor $_n250$ disposed as in FIG. 2.

In FIG. 3, the other function blocks each indicated by a name such as "xxx unit" or "xxx-er (-or)" are illustrated like hardware blocks in the figure, but, in reality, are provided by, for example, execution of the program 301 by the arithmetic operation unit 320 (CPU). However, these function blocks each indicated by a name "xxx unit" or "xxx-er (-or)" (e.g., 330, 340, 350, 321, 322 and 323) can actually be provided in the form of hardware blocks, and the present embodiment is not intended to hinder such implementation.

An overview of operation of the respective function blocks in FIG. 3 will be described below.

The arithmetic operation unit 320, which is the control apparatus, generates an operation command for a driving unit $_n230$, for example, based on an operation command from the operation instructing unit 310 or based on teaching data or the robot control program stored in the storage apparatus 300 to control operation of the driving unit $_n230$.

Here, in order to determine a joint driving force of a n-th joint, the arithmetic operation unit 320 performs feedback control using a detected value from the force sensor $_n250$ for the n-th joint. The force sensor $_n250$ receives an input of operation of the driving unit $_n230$ and outputs a detected value of a force around the driving axis $_n200$, the force acting on an n-th link driven by the n-th joint on the arm end side.

In that case, an other axial direction force calculating unit 321 (other axial direction force calculation process) calculates force in other axial directions acting on the n-th joint. One of inputs to the other axial direction force calculating unit 321 is a dynamic force acting on the n-th link (driven by the relevant joint), which is calculated by a calculating unit 340 for the n-th joint. Also, another input to the other axial direction force calculating unit 321 is a (previously calculated) detected value from a force sensor $_{n+1}350$ of an n+1-th joint. A process of arithmetic operation by the other axial direction force calculating unit 321 corresponds to an other axial direction force calculation process in which force in directions other than a predetermined direction (driving direction) of the joint, the force acting on the force sensor $_n250$ of the joint (force in other axial directions), is calculated.

Furthermore, an other axial direction interference calculating unit 322 (other axial direction interference calculation process) calculates interference in the other axial directions using the force in the directions other than the predetermined direction (driving direction) of the joint, which have been calculated by the other axial direction force calculating unit 321 (other axial direction force calculation process) (force in the others axial directions) and a sensitivity matrix $_n330$ for the force sensor $_n250$ of the joint. Here, as mentioned above, interference in the other axial directions is an amount of error caused by forces in axial directions other than the driving direction of the joint, which is contained in a detected value from the force sensor $_n250$ of the joint. In other words, interference in the other axial directions is the error to be subtracted from the detected value of the sensor, the error being caused by the calculated force in the directions other than the predetermined direction.

The sensitivity matrix $_n330$ may include, for example, a relationship between force (torque) applied to the relevant force sensor $_n250$ around at least two three-dimensional coordinate axes perpendicular to a driving axis of the joint, and an output value of the force sensor $_n250$. Also, the sensitivity matrix $_n330$ may include a relationship between force (torque) applied around the driving axis of the joint, which the force sensor $_n250$ is intended to detect, and an output value of the force sensor $_n250$.

As a result of the sensitivity matrix $_n330$ being configured as described above, for example, the other axial direction interference calculating unit 322 can calculate an error caused by the force in the other axial directions, which appears in an output value of the force sensor $_n250$ and a magnitude of interference in the other axial directions using the force in the other axial directions calculated by the other axial direction force calculating unit 321, and the sensitivity matrix $_n330$. The sensitivity matrix $_n330$ can be provided in the form of, for example, a table memory in the storage apparatus 300.

Furthermore, a corrector 323 (correction process) subtracts the interference in the other axial directions, which is the error calculated by the other axial direction interference calculating unit 322, from the detected value from the force sensor $_n250$ and thereby corrects the detected value from the force sensor $_n250$ disposed at the n-th joint.

A controller 324 can control the driving force of the driving unit $_n230$, using a current value of the driving force of the n-th joint, which has been corrected (interference in the other axial directions have been removed) by the corrector 323 (correction process).

Figure 6:
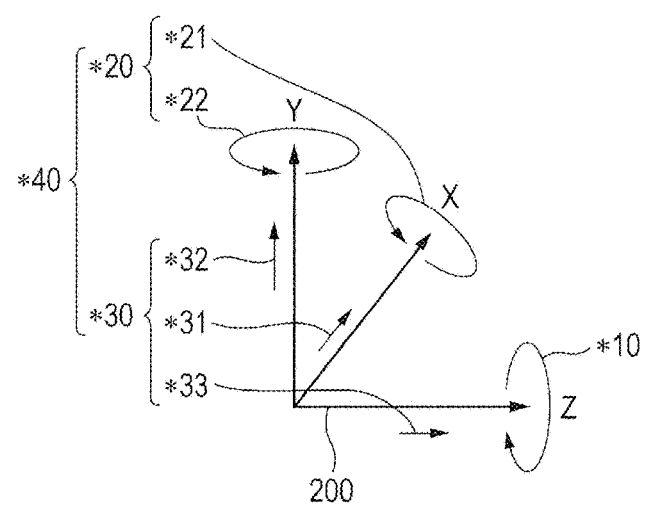
FIG. 6 is a diagram illustrating force in other axial directions exerted on a joint of a robot arm.

As described above, force in other directions such as illustrated in FIG. 6 is exerted around a driving axis $_n200$ of a joint. In FIG. 6, reference numeral 10 denotes force exerted around the driving axis $_n200$, which is detected by a force sensor $_n250$. The force (10) detected by the force sensor $_n250$ contains other axial direction force 40. The other axial direction force 40 contains moment components (20) and translational force components (30), and as described above, in the present embodiment, control for removing the effect of the other axial direction force 40 from the detected value (10) from the force sensor $_n250$ is performed.

Information processing in the function blocks in FIG. 3 described above is organized as follows with emphasis on an input/output relationship.

The arithmetic operation unit 320 includes the other axial direction force calculating unit 321, the other axial direction interference calculating unit 322, the corrector 323 and the controller 324. The other axial direction force calculating unit 321 receives inputs of a calculated value of a dynamic force acting on a n-th link, which is by the calculating unit 340 calculating a dynamic force according on the n-th link, and a detected value from a force sensor $_{n+1}350$ of an n+1-th joint, and outputs force in other axial directions acting on a force sensor $_n250$ of the n-th joint.

The other axial direction interference calculating unit 322 receives inputs of the force in other axial directions acting on the force sensor $_n$250, which is output by the other axial direction force calculating unit 321 and a sensitivity matrix $_n$330 for the force sensor $_n$250, and outputs an error in detected value from the force sensor $_n$250, which has been caused by interference in the other axial directions.

The corrector 323 receives inputs of the error in detected value of the force sensor $_n$250, which has been output from the other axial direction interference calculating unit 322, and the detected value of the force sensor $_n$250, and outputs a value resulting from correction of the detected value of the force sensor $_n$250.

The controller 324 receives inputs of an operation command for a driving unit $_n$230, which is output from the operation instructing unit 310, and the value resulting from correction of the detected value of the force sensor $_n$250, which has been output from the corrector 323, and outputs an operation command for the driving unit $_n$230.

In the below description, as expressed with subscripts such as n and n+1, in the configuration illustrated in FIG. 3, where processing for a joint driving force of an n-th joint is performed, it is necessary that processing for a joint driving force of an n+1-th joint be already performed. Thus, the above processes are performed in the order starting from a joint on the end side of the robot arm 1 in the multijoint configuration. Such joint driving force measurement processing can be expressed in a form such as the flowchart in FIG. 4.

Details of processing in the other axial direction force calculating unit 321, the other axial direction interference calculating unit 322, the corrector 323 and the controller 324 in the arithmetic operation unit 320 in FIG. 3 will be described below with reference to the flowchart in FIG. 4.

Figure 4:
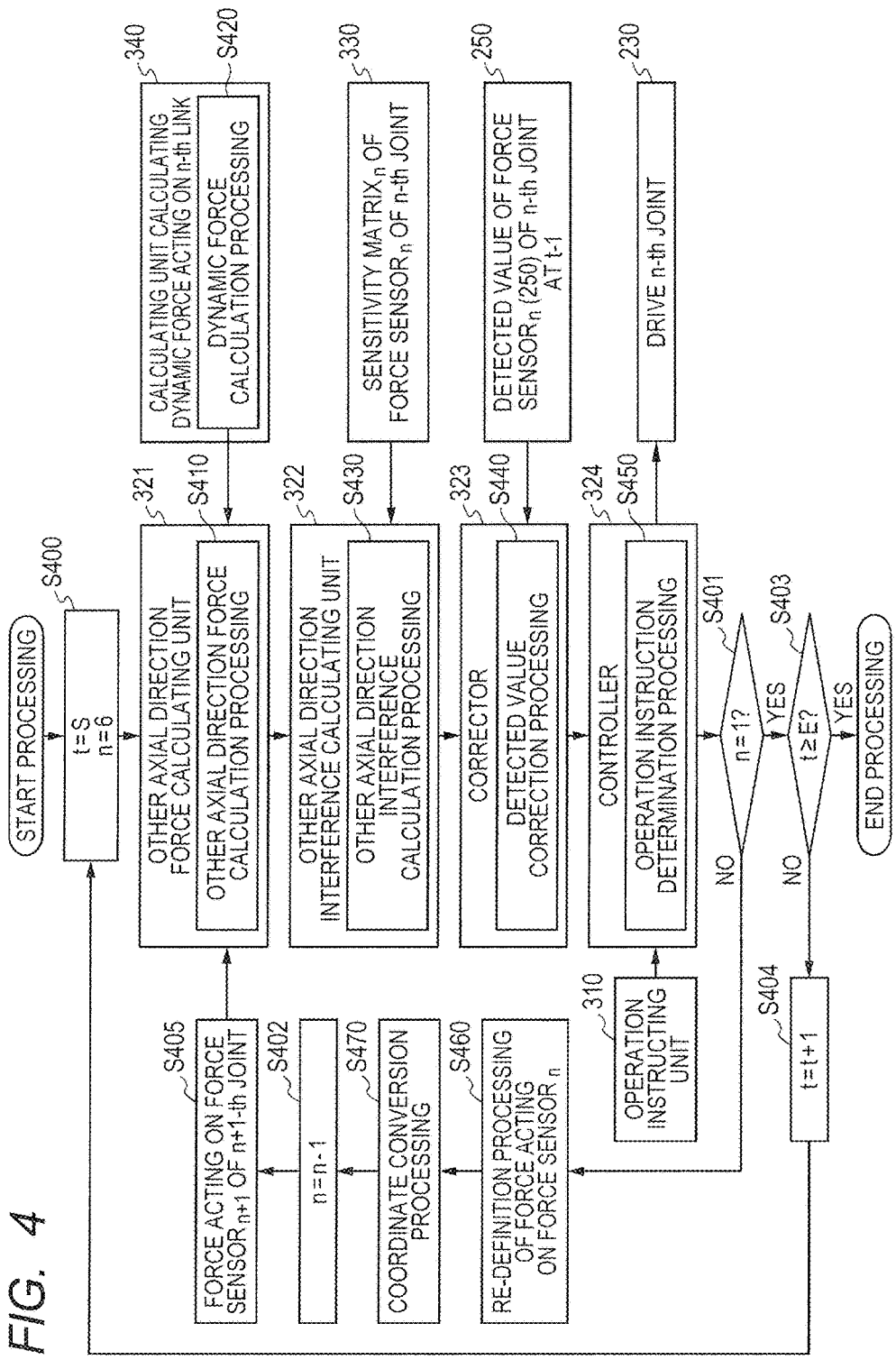
FIG. 4 is a flowchart illustrating a flow of measurement and driving control of a driving force of a joint in the control system in FIG. 3.

The flowchart in FIG. 4 indicates a control procedure in which for first to sixth joints, interference in other axial directions is subtracted from force detected by a force sensor $_n$250 of each joint and the resulting value is fed back to the driving unit $_n$230 of the relevant joint. The control in FIG. 4 is configured so that the control can be performed in real time, for example, during work handling a work via the robot arm 1.

Thus, in the control in FIG. 4, a maximum time period (times S to E) for joint control is determined (S400), and if joint control does not end within the maximum time period (S403), the joint control in FIG. 4 is discontinued. However, the limitation of time consumed for one set of joint control is not essential in the present embodiment. However, limitation of time for one set of joint control for all the joints of the robot arm 1 enables, for example, effective use of calculation resources of the CPU included in the arithmetic operation unit 320 and reduction in risk of stagnation or malfunction of, e.g., position and pose control, which is primary.

In step S400, with a joint number (n) of a first processing target joint and control of all of the joints as one set, a variable of consumed time t consumed for performing one or several sets of control is reset to an initial value S (start time). Among these, an index of the joint number (n) can be provided using a variable area assigned in an internal register in the CPU included in the arithmetic operation unit or a stack or a certain address in a RAM. Also, consumed time t for one set of all the joints can be measured using, e.g., a non-illustrated RTC (real time clock).

In the case of the present embodiment, in step S400, 6 is assigned to n indicating the number of each of a joint and a link of the robot arm 1, control of the sixth joint 126 in FIG. 1 is performed first. Subsequently, while the value of n is decreased to 5, 4, 3 . . . (S402), the entire loop indicated in FIG. 4 is executed, whereby control of the joints is performed in the order from the end side to the base side.

In FIG. 4, other axial direction force calculation processing (step S410) corresponds to processing in the other axial direction force calculating unit 321 in FIG. 3. In the other axial direction force calculation processing (S410), a balance expression of force acting on an n-th link driven by an n-th joint (Expression (1) below) is solved to calculate force acting on a force sensor $_n$250 of the n-th joint.

[Expression 1]

$$f_{jn} = F_{jn} + f_{jn+1} \tag{1}$$

Here, In Expression (1) above, the first term of the left side is force acting on a force sensor $_n$250 of an n-th joint, and the first term of the right side is dynamic force acting on an n-th link. Also, the second term of the right side is force acting on a force sensor $_{n+1}$350 of an n+1-th joint adjacent to the n-th joint on the end side of the robot arm 1 (step S405). In the processing in FIG. 4, the force acting on the force sensor $_{n+1}$350 of the n+1-th joint in the second term of the right side has already been calculated through later-described re-definition processing (S460).

In other axial direction calculation processing (S410), Expression (1) is solved in terms of the first term of the left side to determine force in the respective directions acting on the force sensor $_n$250, enabling calculation of force in other axial directions acting on the sensor $_n$250.

Here, where n=6, there is no seventh joint in the robot arm 1, and thus, the second term of the right side of Expression (1) is zero, and where n=5 or less, force acting on a relevant force sensor $_{n+1}$350 is used.

Figure 9:
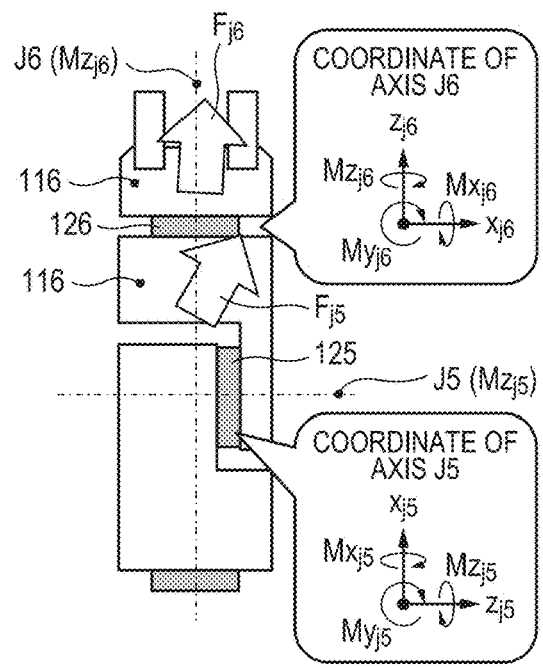
FIG. 9 is a diagram illustrating a disposition of joints at an end part of the robot arm in FIG. 1 and forces exerted on respective parts.

For example, FIG. 9 illustrates an end part of the robot arm 1 of the robot apparatus in FIG. 1, that is, links joined via two joints 125 (J5), 126 (J6). Forces Fj5, Fj6 exerted on these joints 125 (J5), 126 (J6) can be indicated as Expression (2) below.

[Expression 2]

$$\begin{bmatrix} Mx_{j5} \\ My_{j5} \\ Mz_{j5} \end{bmatrix} = F_{j5} + \begin{bmatrix} My_{j6} \\ My_{j6} \\ Mx_{j6} \end{bmatrix} \tag{2}$$

Expression (2) is used in particular for a special case where n=5 in Expression (1). The first term of the left side is force acting on a force sensor $_n$250 of a joint 125 (J5). The force includes forces Mxj5, Myj5, Mzj5 around the three axes of the joint, which are indicated in FIG. 9. Also, the second term of the right side is force acting on a force sensor $_{n+1}$350 of a joint 126 (J6). The force includes forces Mzj5, Myj5, Mxj5 around three axes of the joint, which are indicated in FIG. 9. These forces are put on respective positions in respective matrixes corresponding to respective positional relationships among joint axes in FIG. 9.

Also, the first term of the right side in Expressions (1), (2), that is, dynamic force acting on the n-th link is calculated by means of dynamic force calculation processing (step S420) in FIG. 4. The dynamic force calculation processing (S420) corresponds to the calculating unit 340 in FIG. 3, and the force acting on the n-th link is calculated using static information and dynamic information on the n-th link. The static information used for arithmetic operation in the dynamic force calculation processing (step S420) includes information on a shape, inertia, elasticity and/or a pose of the link, and the dynamic information includes information on a speed and an acceleration of the link. As a matter of course, among these, static conditions such as the shape, the inertia and the elasticity of the link is known from design information on the robot arm 1, and thus can be stored in advance in the storage apparatus 300. Also, the processing in FIG. 4 is to be performed during control of the robot arm 1 in a certain position or pose, and thus, the arithmetic operation unit 320 (CPU) can identify dynamic conditions such as the pose of the joint and the speed and the acceleration of the link at the current point of time from the robot control program that is being executed.

Also, in the present embodiment, in the other axial direction force calculation processing (S410), particularly for force acting on the n+1-th joint, a corrected detected value from the force sensor $_{n+1}$350, which is re-defined and converted into coordinates in later-described steps S460 and S470, is used (S405). However, as indicated in Embodiment 2, which will be described later, in the other axial direction force calculation processing (S410), a calculated value of dynamic force acting on the n-th link alone, which is calculated by the calculating unit 340 of calculating dynamic force acting on an n-th link, may be used. In this case, force in other axial directions exerted on the relevant n-th joint is calculated based on dynamic conditions such as the pose of the robot arm and the speed and the acceleration of the link at the current point of time.

Here, force exerted on a joint n, which is calculated by the dynamic force calculation processing (S420) can be organized and indicated, for example, as Expression (3) below.

[Expression 3]

$$F_{jn} = I\ddot{\theta}_{jn} + C\dot{\theta}_{jn} + K\theta_{jn} \quad (3)$$

In Expression (3) above, the first term of the right side is an acceleration proportional term determined by, e.g., a length and a mass of a link supported by the joint, and the second term of the right is a speed proportional term determined by, e.g., a speed of rotational driving of the joint. Also, the third term of the right side is a position proportional term determined by, e.g., elasticity of the link supported by the joint.

Subsequent to the above other axial direction force calculation processing (S410), in other axial direction interference calculation processing (step S430), an amount of error in detected value from the force sensor $_n$250, caused by the force in the other axial directions calculated above, that is, interference in the other axial directions is calculated. The other axial direction interference calculation processing (step S430) corresponds to the processing in the other axial direction interference calculating unit 322 in FIG. 3.

In the other axial direction interference calculation processing (step S430), the force in other axial directions acting on the force sensor $_n$250 calculated in the other axial direction force calculation processing (S410) and a sensitivity matrix $_n$330 for the force sensor $_n$250 are multiplied to calculate a sensor detected value error caused by the interference in the other axial directions. As mentioned above, the sensitivity matrix $_n$330 is provided, for example, in the storage apparatus 300, and stores a relationship between force in other axial directions acting on the force sensor $_n$250 and a sensor detected value error caused by interference in the other axial directions.

Subsequently, in detected value correction processing (step S440), the detected value from the force sensor $_n$250 is corrected using the other axial direction interference value calculated in the other axial direction interference calculation processing (step S430). The detected value correction processing (step S440) corresponds to the processing in the corrector 323 in FIG. 3. In the detected value correction processing (S440), the detected value from the force sensor $_n$250 is corrected by subtracting the sensor detected value error caused in the force sensor $_n$250, which has been calculated in the other axial direction interference calculation processing 430, from the detected value from the force sensor $_n$250.

Next, in operation instruction determination processing (step S450), driving control of a driving unit $_n$230 of the n-th joint is performed based on the corrected detected value from the force sensor $_n$250. The operation instruction determination processing (step S450) corresponds to processing in the controller 324 in FIG. 3, and for example, following driving force control is performed. For example, in the operation instruction determination processing (step S450), force around a driving axis $_n$200 provided by the driving unit $_n$230 to the n-th link (target value) is calculated according to an operation instruction output from the operation instructing unit 310. Also, a deviation of the corrected detected value from the force sensor $_n$250 calculated in the detected value correction processing (step S440) (actual value) from the target value is calculated. Then, for example, an operation instruction for the driving unit $_n$230 is determined so as to reduce the deviation of the actual value from the target value of the force around the driving axis n200 provided to the n-th link, based on an operation instruction.

The control loop in FIG. 4 has two bifurcation steps, S401 and S403 last. First, in step S401, whether or not the value of n is 1 is determined. If n=1, that is, the processing has sequentially been performed starting from the sixth to the first joint, the processing transitions to step S403, and if not, the processing transitions to step S460 to perform processing for next n−1-th joint. The proceeding of the processing from step S401 to step S403 means an end of one set of control of the sixth to first joints. In step S403, whether or not the variable of the consumed time t reset in S400 indicates a predetermined end time E or later is determined. In the case of affirmative determination in step S403, the consumed time t exceeds the predetermined maximum processing time period (S to E), and thus, the processing for measurement and joint driving force control in FIG. 4 is terminated.

On the other hand, in the case of negative determination in step S403, which is equivalent to a recognition that there is still some time to perform a next set of control of the sixth to first joints, and in this case, the processing returns to step S400 through step S404. Here, in step S404, the variable of the consumed time t is incremented. Although in step S404 in the figure, a simplified indication of "t+1" is employed, in step S404, processing for adding actual time measured by, e.g., a RTC may be performed. Or, processing for adding time required for one set of control of the sixth to first joints, the required time being calculated in advance, may be performed. Also, the unit of the increment does not necessarily need to be a time unit such as ms or μs, and another type of unit may arbitrarily be employed. In that case, it should be understood that definition of the end time E is determined so as to correspond to the unit of the increment in step S404.

On the other hand, in the case of negative determination in step S401, the processing of one set up to the first joint has not ended, and thus the processing returns to step S410 described above through steps S460, S470, S402 and S405.

First, in re-definition processing for re-definition of the force applied to the force sensor n in step S460, the calculated value of the force acting on the force sensor $_n$250 obtained by solving Expression (1) in the other axial direction force calculation processing (S410) is replaced with the detected value from the force sensor $_n$250, which has been corrected in the detected value correction processing (S440). It should be understood that this replacement processing is performed only for the component around the joint driving axis detected by the force sensor $_n$250.

In coordinate conversion processing in step S470, coordinate conversion processing for converting the calculated value of the force acting on the force sensor $_n$250 from an expression based on reference coordinate axes of the n-th joint into an expression based on reference coordinate axes of a next n−1-th joint adjacent to the n-th joint on the base 110 side is performed. In this coordinate system conversion, a coordinate expression of the force acting on the force sensor $_n$250, which has been modified in the re-definition processing of the force acting on the force sensor (S460) (expressed by a vector or a matrix) is converted. Here, the arithmetic operation unit 320 can calculate, for example, positions or poses (position and orientation) of the joint axes of the n-th joint and the n−1-th joint, which is a next processing target, from an instruction from the operation instructing unit 310 or the robot control program. Here, coordinate system of conversion of a coordinate system with the joint axis of the n-th joint as (for example) the Z-axis into a coordinate system with the joint axis of the n−1-th joint as (for example) the Z-axis may be performed.

In step S402, in order to indicate a next joint adjacent to the n-th joint on the base side, n, which is an index of a joint, is decremented by 1 (n=n−1). Consequently, the n-th joint for which the process has just ended is referred to as an n+1-th joint in the next joint processing.

In other words, in step S405, the second term of the right side of Expression (1), that is, the force acting on the force sensor $_{n+1}$350 of the n+1-th joint adjacent to the n-th joint on the end side, the force subjected to the coordinate conversion and the re-definition in immediately-previous steps S460, S470 and S402 is used.

Subsequently, the processing in step S410 onwards is repeated for the next n-th joint. The processing for measurement and joint driving force control in FIG. 4 is performed with the processing unit of processing of sixth to first joints as one set. Also, the processing for measurement and joint driving force control in FIG. 4 is performed for one or several sets until the maximum time (E) is reached.

Effects of Embodiment 1

As a result of the joints of the robot arm 1 being configured as in FIGS. 1 and 2, a pathway extending through a force sensor is only one pathway of force transferred between two links connected to each of the joints of the robot arm. Thus, a force sensor $_n$250 of an n-th joint directly receives force in other axial directions acting on an n-th link 220, enabling simplification of a transfer pathway for transfer of the force in the other axial directions acting on the n-th link 220 to the force sensor $_n$250. In the conventional joint configuration, force transferred through a joint is transferred via mechanical elements such as a cross roller bearing and/or an oil seal, and thus, there are pathways of force transfer between two links connected to a joint other than a pathway extending through a force sensor. On the other hand, in the present embodiment, a pathway extending through a force sensor is an only pathway of transfer of force between two links joined via the joint. Thus, a value of force in other axial directions acting on a force sensor $_n$250 can easily be grasped. Consequently, provision of the other axial direction force calculating unit 321 in the robot control apparatus 2 enables high-precision determination of force in other axial directions received on the force sensor $_n$250 and also enables the below measurement control to be performed more accurately.

Furthermore, in the present embodiment, the other axial direction interference calculating unit 322 is provided in the robot control apparatus 2. Consequently, an error in detected value from the force sensor $_n$250, caused by interference in other axial directions, can be modified with high precision. Consequently, force around a driving axis can accurately be measured, and use of the force around the driving axis for driving control of the robot arm 1 enables accurate and reliable control of the driving force in the robot arm 1. Therefore, the end-effector 117 at the distal end of the robot arm 1 can control force provided to a component (work) with high precision. Thus, even in a process requiring a load provided to a component to be around several grams such as a process of attachment of a soft object or a low-strength member, proper joint driving force control can be performed. Consequently, the likelihood that automation of a process of attachment of a soft object or a low-strength member, which has conventionally been difficult, is achieved by a robot apparatus is increased.

Also, the control in FIG. 4 is performed in such a manner that, with processing for all the joints included in the robot arm 1 determined as one set, time consumed for processing performed for one or several sets does not exceed the maximum processing time period (S to E). Thus, for example, the calculation resources of the CPU included in the arithmetic operation unit 320 can effectively be used, enabling reduction in risk of stagnation or malfunction of, e.g., position and pose (position and orientation) control, which is primary.

Embodiment 2

In Embodiment 2, an alteration of joint driving force measurement and control based on the measurement indicated in FIG. 4 will be described. Hardware configurations of a robot system and a control system for the robot system may be the same as those of Embodiment 1 above.

Figure 5:
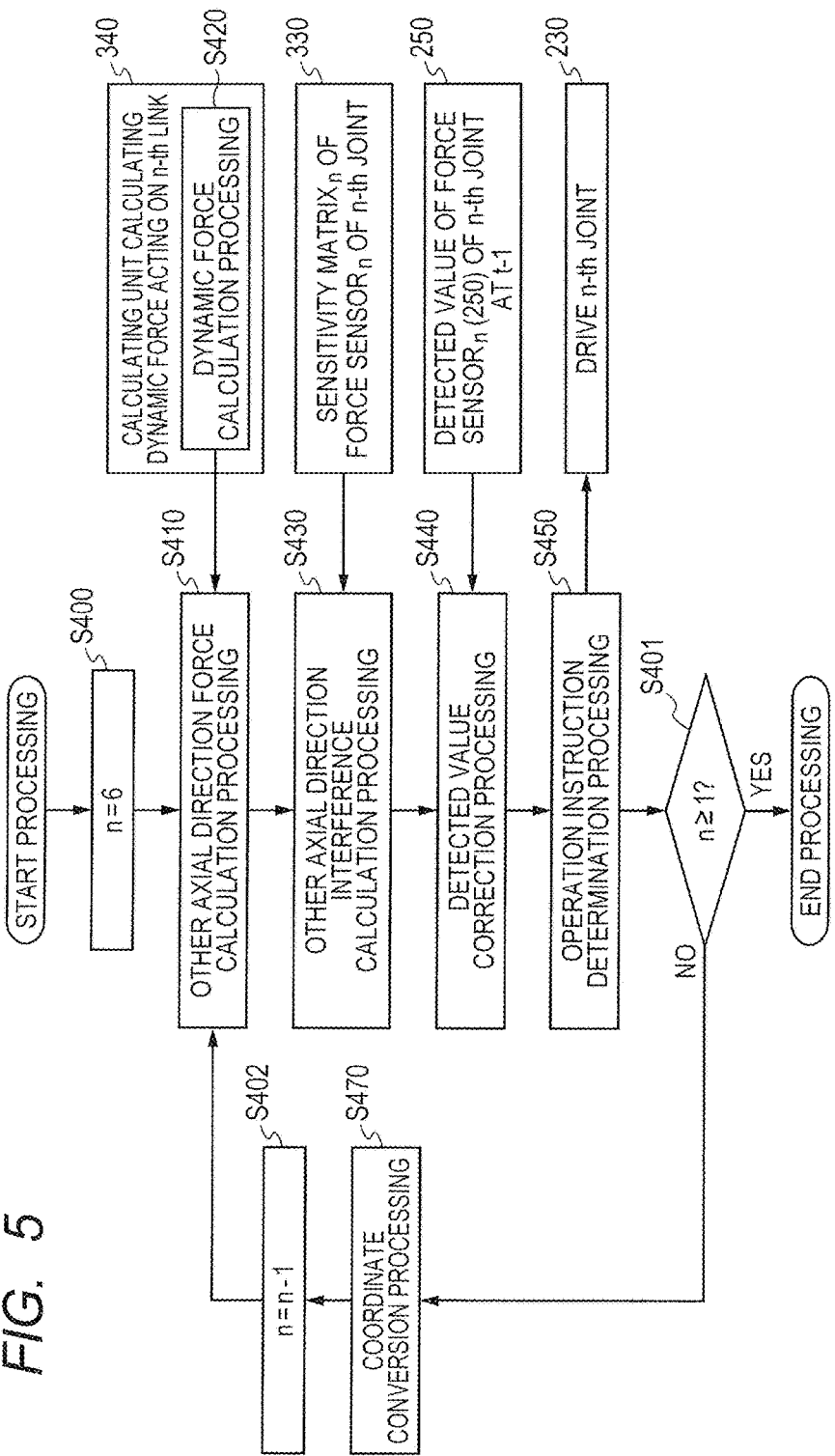
FIG. 5 is a flowchart illustrating another flow of measurement and driving control of a driving force of a joint in the control system in FIG. 3.

FIG. 5 is a flowchart illustrating an alteration of joint driving force measurement and control based on the measurement indicated in FIG. 4. In FIG. 5, steps that are similar to those in FIG. 4 are provided with step numbers that are the same as those in FIG. 4, and overlapping description of details of the steps will be omitted below. In FIG. 5, the relationship with the function blocks in FIG. 3 are similar to those in FIG. 4, and illustration thereof is also omitted.

The control in FIG. 5 is different from that in FIG. 4 in that in driving control of an n-th joint of a robot arm 1, no detected value from a force sensor $_{n+1}$350 of a n+1-th joint is used in other axial direction force calculation processing (S410 in FIG. 5). In the other axial direction force calculation processing (S410) in FIG. 5, force in other axial directions acting on a force sensor $_n$250 of an n-th joint is calculated using only a calculated value of dynamic force acting on the n-th link, which is calculated by a dynamic force calculating unit (340 in FIG. 3). In the present embodiment, in the other axial direction force calculation processing (S410 in FIG. 5), force in other axial directions exerted on the relevant n-th joint is calculated based on dynamic conditions such as a pose of the robot arm and a speed and an acceleration of a link at that point of time including force exerted on the n+1-th joint.

Thus, in the control in FIG. 5, on a route of transition to processing for a next joint, only coordinate conversion processing (S470) and decrement of n (S402), which is an index indicating a joint are performed, and no re-definition processing (S460 in FIG. 4) is performed. Here, in the coordinate conversion processing (S470) in FIG. 5, processing for changing at least a coordinate system used for expression of force used in arithmetic operation from a coordinate system of a current pose of the robot arm 1 with an n-th joint as an origin to a coordinate system with an n−1-th joint as an origin may be performed.

Also, in the control in FIG. 5, reset of consumed time t in step S400 in FIG. 4, consumed time determination in S403 and increment of the consumed time t in S404 are omitted. This is because increase in speed of processing can be expected because of, for example, omission of the above-described re-definition processing (S460 in FIG. 4), but as in the control in FIG. 4, processing with a limitation of maximum time for processing with all the joints as one set may be performed.

Effects of Embodiment 2

In the control according to Embodiment 2, basically, effects that are similar to those of Embodiment 1 above can be expected. In other words, provision of an other axial direction force calculating unit 321 (FIG. 3) enables high-precision determination of force in other axial directions acting around a detection axis of a force sensor $_n$250. Then, a detection error (interference in the other axial directions) caused in the force sensor $_n$250 by the forces in other axial directions can be modified with high precision using a sensitivity matrix $_n$330 provided in advance. Thus, a force acting on a work via, e.g., an end-effector 117 of a distal end of the robot arm 1 can be controlled high precision. Consequently, the likelihood that automation of a process requiring a load provided to a component to be around several grams such as a process of attachment of a soft object or a low-strength member is achieved by a multijoint robot arm is increased.

Also, according to Embodiment 2, the force in the other axial directions acting on a force sensor $_n$250 of an n-th joint is calculated with re-definition processing of a detected value from the force sensor $_n$250 of a joint for which processing has ended (S460 in FIG. 4) omitted and using only a calculated value of dynamic force acting on the n-th link. Thus, for example, calculation resources of a CPU included in an arithmetic operation unit 320 can effectively be used, enabling reduction in risk of stagnation or malfunction of, e.g., primary position and pose control, which is primary.

(Alterations and the Like)

In the above description, a vertical six-axis multijoint configuration is indicated as an example of the configuration of the robot arm 1. However, the present invention is not limited by the number of joints or a joint configuration. For example, if the number of joints of a robot arm is no less than two, measurement and joint control that are similar to those described above can be performed, and for any of the joints, the joint configuration illustrated in FIGS. 1 and 2 can be provided. Also, where the robot arm has a horizontal multijoint configuration or a parallel link configuration, the above-described joint configuration can be provided and measurement and joint control that are similar to those described above can be performed, and thus effects similar to the above can be expected.

Also, although rotary joints have mainly been indicated as joints of the robot arm 1, for a slider joint such as illustrated in FIG. 8, also, measurement and joint control that are similar to those described above can be performed, and thus effects similar to the above can be expected. Also, although an electric motor and a reducer have been indicated as an example of a driving unit $_n$230 of a joint of the robot arm 1, where a driving unit includes, e.g., a hydraulically-driven actuator, also, measurement and joint control that are similar to those described above can be performed, and thus effects similar to the above can be expected. Also, although a constraining part $_n$240 has been configured using a cross roller bearing 241, where a constraining part is configured using any of various rolling bearings and linearly-driven bearings as an alteration thereof, also, measurement and joint control that are similar to those described above can be performed, and thus effects similar to the above can be expected.

The robot control apparatus 2's control indicated in FIGS. 3 to 5 can be performed by, for example, a CPU (central processing unit). Therefore, the control may also be performed by supplying a recording medium with a program recorded therein, the program providing the above-described functions, to the robot control apparatus 2 and making the computer (the CPU or the MPU) included in the robot control apparatus 2 read and execute the program stored in the recording medium. In this case, the program itself read from the recording medium provides the functions in each of the above-described embodiments, and thus, the program itself and the recording medium with the program recorded therein are included in the present invention.

Also, as an example of a computer-readable recording medium with a program recorded therein, the program providing the present invention, the storage apparatus 300 such as, for example, an HDD has been indicated. However, as a computer-readable recording medium with a program recorded therein, the program providing the present invention, an arbitrary recording medium may be used regardless of whether the storage (recording) medium is of a fixed type or a removable type. The program that provides the present invention may be recorded in any type of recording medium as long as the recording medium is a computer-readable recording medium. For this type of recording medium, e.g., a ROM (which may be, e.g., an EEPROM or a flash memory), a flexible disk, a hard disk, an optical disk, a magnetooptical disk, a CD-ROM, a CD-R, a magnetic tape or a non-volatile memory card can be used. Also, the program according to the present embodiment can be performed by a computer as a result of, e.g., downloading the program via a network and copying the program on the RAM or writing the program onto an EEPROM.

Also, the present invention is not limited to a case where the functions according to the present embodiment are provided by executing program codes read by a computer. The present invention includes a case where, e.g., an OS (operating system) operating on a computer performs a part or all of actual processing based on instructions according to the program codes and the functions according to the above-described embodiments are provided by the processing.

Furthermore, the program codes read from the recording medium may be written into a function extension board inserted in the computer or a memory included in a function extension unit connected to the computer. The present invention includes a case where, e.g., a CPU included in the function extension board or a function extension unit performs a part or all of actual processing based on instructions according to the program codes and the functions according to the present embodiment are provided by the processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-210914, filed Oct. 27, 2015, which is hereby incorporated by reference herein in its entirety.

What is claimed is:

1. A driving mechanism for driving a first link and a second link relative to each other, the driving mechanism comprising:
    a driving source that drives the second link relative to the first link;
    a part to be driven by the driving source;
    a bearing that constrains the second link so as to be movable in a predetermined direction; and
    a sensor for detecting a value related to force,
    wherein:
    the bearing contacts with the part to be driven,
    the sensor is provided so as to be movable with the second link by the bearing in the predetermined direction with respect to the first link, the sensor being supported by the part to be driven and the second link between the part to be driven and the second link,
    the force is transferred via the part to be driven, the sensor and the second link as a path where the force is transferred, and
    an another bearing other than the bearing is not provided on a path of the sensor and the second link.

2. The driving mechanism according to claim 1, further comprising a reducer for reducing driving of the driving source,
    wherein:
    the part to be driven includes an output shaft of the reducer and a connecting member connected to the output shaft,
    the bearing contacts with the connecting member, and
    the sensor being supported by the connecting part and the second link between the connecting part and the second link.

3. The driving mechanism according to claim 1, wherein the second link does not contact with the bearing and the alternative bearing.

4. A robot apparatus measurement method for measuring a robot apparatus that includes a multijoint robot arm including a plurality of joints each including a driving mechanism according to claim 1 and corrects a detected value from a sensor provided at each of the joints, the sensor determining force acting on a link joined to the relevant joint, the method comprising:
    an other axial direction force calculation process of making a control apparatus calculate force in another axial direction other than a driving direction of a joint from among the joints, the force acting on the sensor provided at the joint, using a detected value detected by the sensor of the joint and a detected value from the sensor for a joint adjacent to the joint on the end side in the multijoint robot arm, the detected value being corrected by a correction process stated below;
    an other axial direction interference calculation process of making the control apparatus calculate an error in detected value from the sensor based on the force in the other axial direction calculated in the other axial direction force calculation process, using a sensitivity matrix for the sensor, the sensitivity matrix storing a relationship between the force in the other axial direction and an error in detected value from the sensor; and
    a correction process of making the control apparatus subtract the error calculated in the other axial direction interference calculation process from the detected value from the sensor and thereby correct the detected value from the sensor.

5. The robot apparatus measurement method according to claim 4, wherein the control apparatus performs each of the processes in an order starting from the joint on the end side of the multijoint robot arm.

6. The robot apparatus measurement method according to claim 4, wherein when the force in the other axial direction is calculated in the other axial direction force calculation process, an output value from the sensor of the adjacent joint on the end side is used as a value of force applied to the adjacent joint on the end side.

7. The robot apparatus measurement method according to claim 4, wherein when the force in the other direction other than the driving direction is calculated, a calculated value of force acting on the sensor of the adjacent joint on the end side is used as a value of force applied to the adjacent joint on the end side.

8. A robot apparatus control method comprising:
    correcting a detected value from the sensor provided at each of the plurality of joints of the multijoint robot arm using the robot apparatus measurement method according to claim 4; and
    controlling a driving force of each of the plurality of joints using the corrected output values from the sensors.

9. A component manufacturing method comprising:
driving a motor that is driven according to an instruction value, according to an instruction value; and
driving a driving part with a speed of an output of the motor reduced, to move a first link and a second link relative to each other in a predetermined direction to manufacture a part, wherein:
a sensor is provided between the driving part and the second link; and
the instruction value is corrected using a value obtained by calculating force in a direction other than the predetermined direction from a value detected by the sensor and subtracting the error being caused by the calculated force in the direction other than the predetermined direction from the detected value from the sensor.

10. A non-transitory computer-readable recording medium storing a program for causing a robot to execute a component manufacturing method, the method comprising:
driving a motor that is driven according to an instruction value, according to an instruction value; and
driving a driving part with a speed of an output of the motor reduced, to move a first link and a second link relative to each other in a predetermined direction to manufacture a part, wherein:
a sensor is provided between the driving part and the second link;
the instruction value is corrected using a value obtained by calculating force in a direction other than the predetermined direction from a value detected by the sensor and subtracting the error being caused by the calculated force in the direction other than the predetermined direction from the detected value from the sensor.

11. The driving mechanism according to claim 1, wherein the bearing is provided to the first link.

12. The driving mechanism according to claim 1, wherein:
the bearing includes a first supporting part and a second supporting part,
the first supporting part is provided to the first link, and
the second supporting part is provided to the part to be driven.

13. A robot apparatus comprising a link, the robot apparatus comprising:
a driving source that drives the link;
a part to be driven by the driving source;
a bearing that constrains the link so as to be movable in a predetermined direction; and
a sensor for detecting a value related to force,
wherein:
the bearing contacts with the part to be driven,
the sensor is provided so as to be movable with the link by the bearing in the predetermined direction, the sensor being supported by the part to be driven and the link between the part to be driven and the link,
the force is transferred via the part to be driven, the sensor and the link as a path where the force is transferred, and
an another bearing other than the bearing is not provided on a path of the sensor and the link.

14. A method of manufacturing an article using the robot apparatus according to claim 13.

15. The driving mechanism according to claim 12, wherein:
the part to be driven includes:
an output shaft that transfers driving of the driving source; and
a connecting member connected to the output shaft, wherein:
the first supporting part is provided so as to contact with the first link, and
the second supporting part is provided so as to contact with the connecting member.

16. The driving mechanism according to claim 15, wherein the sensor is provided so as to directly link the connecting member with the second link.

17. A method of controlling a robot apparatus comprising a link, the robot apparatus comprising:
a driving source;
a part to be driven by the driving source;
a bearing that constrains the link so as to be movable in a predetermined direction;
a sensor for detecting a value related to force,
wherein:
the bearing contacts with the part to be driven,
the sensor is provided so as to be movable with the link by the bearing in the predetermined direction, the sensor being supported by the part to be driven and the link between the part to be driven and the link,
the force is transferred via the part to be driven, the sensor and the link as a path where the force is transferred,
an another bearing other than the bearing is not provided on a path of the sensor and the link; and
a control apparatus,
the method comprising:
obtaining the force by the sensor; and
controlling, by the control apparatus, the robot apparatus based on the force obtained by the sensor.

18. A non-transitory computer-readable recording medium storing a control program capable of executing the method according to claim 17.

19. The driving mechanism according to claim 1, wherein:
the sensor connects the part to be driven and the second link,
the part to be driven and the second link so as to be movable in the predetermined direction by the bearing supporting the part to be driven with the sensor.

* * * * *